May 19, 1931.  Z. P. CANDEE  1,805,976
TRANSFER MECHANISM
Filed Jan. 2, 1930   2 Sheets-Sheet 2
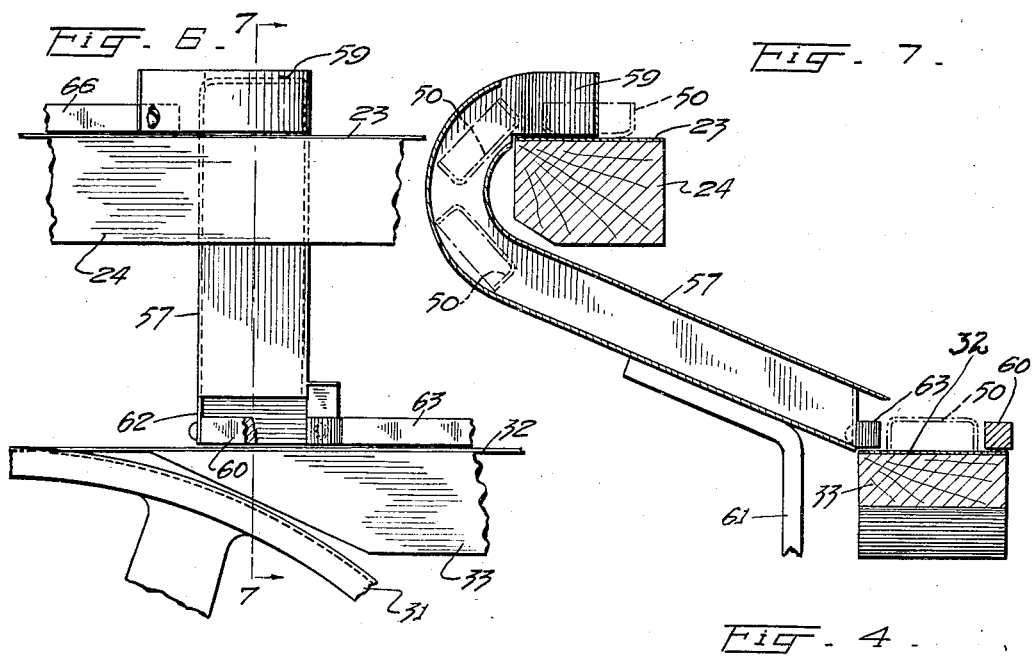
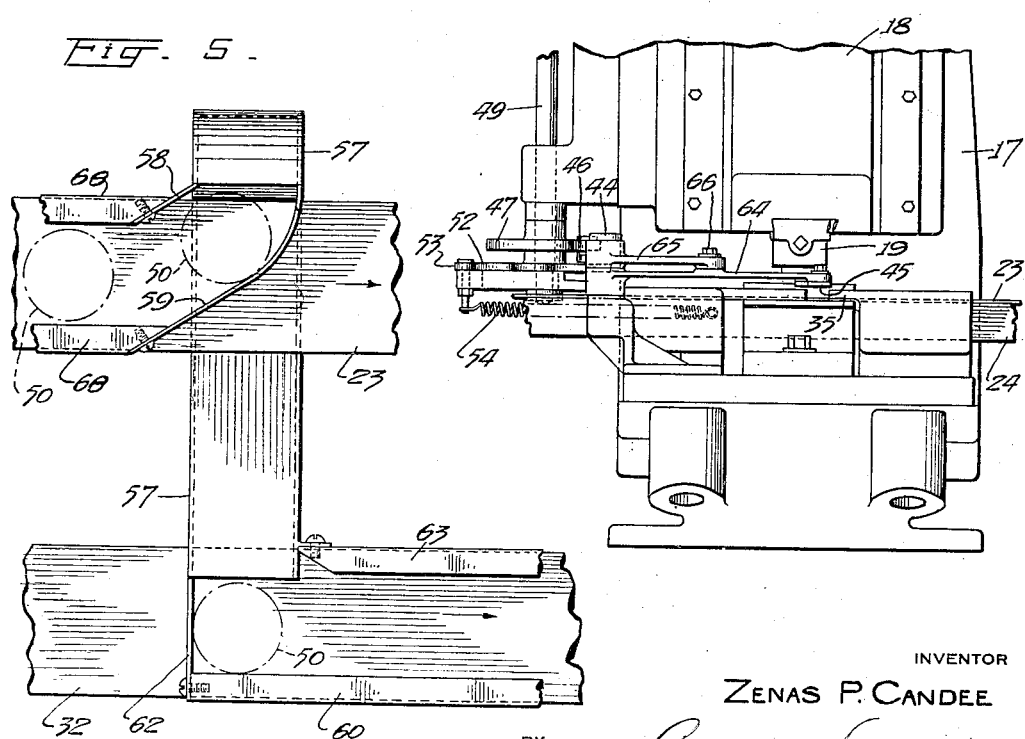
INVENTOR
ZENAS P. CANDEE
BY
ATTORNEY Patented May 19, 1931

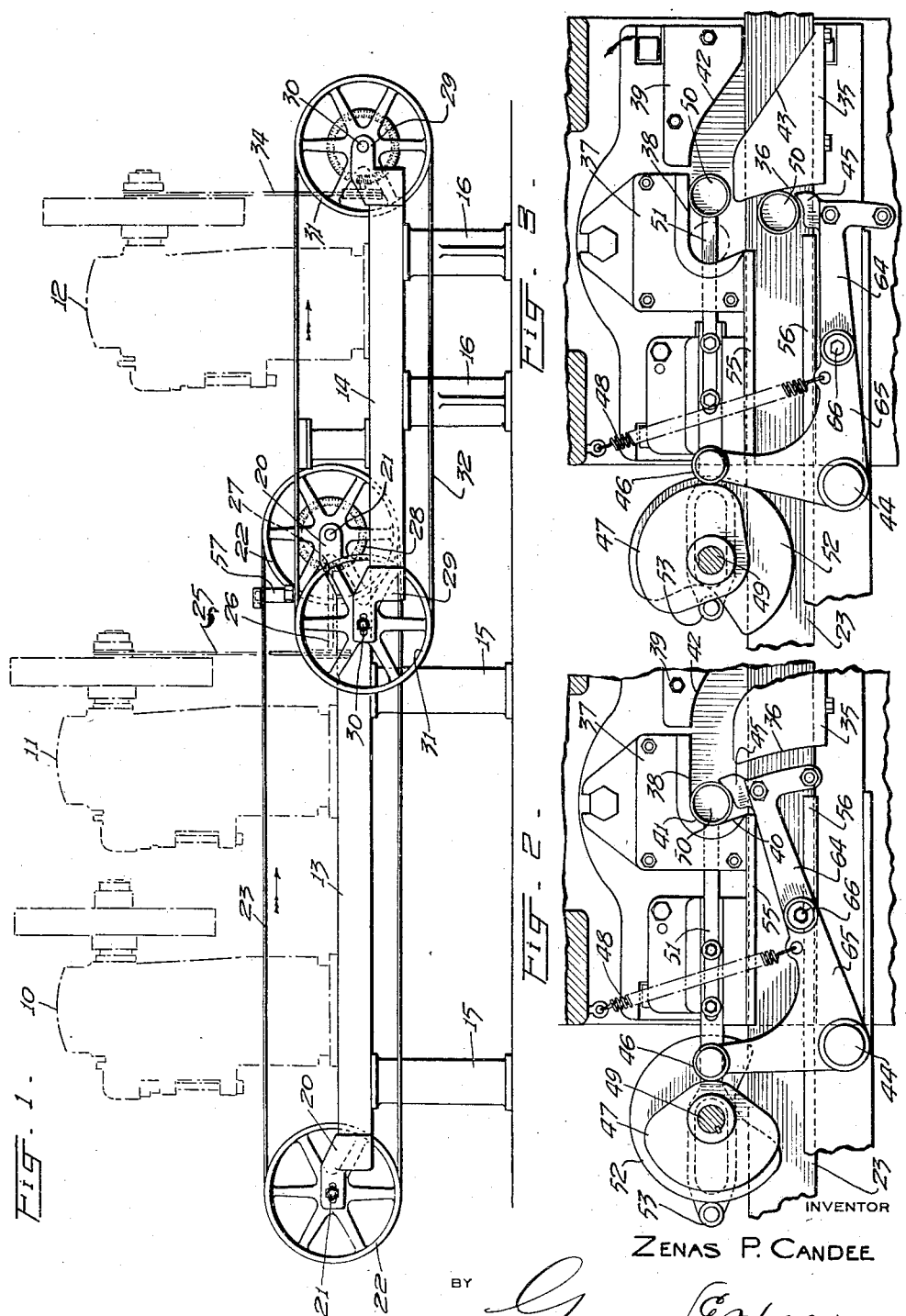

1,805,976

UNITED STATES PATENT OFFICE

ZENAS P. CANDEE, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT

TRANSFER MECHANISM

Application filed January 2, 1930. Serial No. 418,028.

My invention relates to new and useful improvements in transfer mechanism and is designed for transferring articles to and from operating stations by means of a single conveyor belt or the like and to present the articles in different angular positions at different operating stations.

With these and other objects in view, as will more fully hereinafter appear, my invention consists in certain features of novel construction and combination of parts, as hereinafter described and illustrated in the accompanying drawings, and particularly pointed out, wherein patentable novelty is claimed for certain features thereof, it being understood that within the scope of what hereinafter thus is claimed various changes in form, proportion, size, arrangement and details of the construction can be made without departing from the spirit or modifying any of the advantages of the invention.

The following is a description of an embodiment of my invention, reference being had to the accompanying drawings, in which Figure 1 is a side view of one adaptation of my transfer mechanism;

Figure 2 is an enlarged fragmentary plan view of some of the parts adjacent to one of the operating stations;

Figure 3 is a similar view with the same parts in different relative positions;

Figure 4 is a front elevation of the mechanism substantially as shown in Figures 2 and 3 and adjacent parts of the machine at an operating station.

Figure 5 is a plan view of that portion of the mechanism for transferring the workpieces from one conveyor belt to another and changing their relative positions thereon;

Figure 6 is a front view thereof; and

Figure 7 is a transverse sectional view taken generally upon line 7—7 of Figure 6.

Referring more particularly to the drawings, in which similar parts are similarly numbered, I show in broken lines the outlines of three presses, severally designated 10, 11 and 12, which may be of any preferred or conventional form and operated in any usual manner and mounted upon the tables 13 and 14 supported by legs 15—15 and 16—16.

These presses are all of the same general type and comprise a body 17, in which a gate 18 is reciprocated, having tools 19 associated therewith.

In the bed of the machine below the tools 19 are other tools of preferred form (not shown) which combine with the tools 19 to perform an operation upon a workpiece presented thereto.

At each end of the table 13 is a bracket 20, which supports a shaft 21, upon which are rotatably mounted the pulleys 22 that are connected by the conveyor belt 23, the upper portion of which preferably travels over and is supported by a suitable platform 24. Motion is transmitted to said pulleys and belt so that the same will travel in the direction of the arrow in Figure 1 by a belt 25, which rotates a shaft 26 having a bevel pinion 27, the teeth of which mesh into those of a bevel pinion 28 connected with one of the pulleys 22.

As the minimum power is required to move this belt any other form of driving mechanism may be substituted as desired.

Similar brackets 29 are fixed on the ends of the table 14 and support shafts 30, upon which are rotatably mounted the pulleys 31, which are connected by the belt 32, the upper portion of which is supported by a suitable platform 33. This latter belt is caused to travel in the direction indicated by the arrow in Figure 1 by a belt 34 actuating a beveled gear mechanism similar to that with which the belt 25 is associated and above described.

My improved mechanism, particularly as shown in Figures 2, 3 and 4, is substantially the same for each of the several machines. This mechanism consists essentially of a fixed stop plate 35 having a curved face 36, a stop and guide plate 37, which is held in a fixed position with a substantially straight wall 38, a wall 40 angular thereto and connected therewith by a curved wall 41. A guide plate 39 is also fixed relatively to the belt and having an angular wall 42 thereon which is substantially parallel to the angular wall 43 on the stop plate 35.

A push-in lever 64 is pivoted upon the stud 44, having a finger 45 adjustably secured thereto at the outer end thereof. The shape and relative position of the finger may be varied to accommodate workpieces of different sizes and shapes. Also journaled upon the stud 44 is the rock lever 65 which is adjustably connected with the push-in lever 64, by the bolt 66, or the like and carrying upon one of its arms a cam roll 46 which is held in contact with the face of the cam 47 by a spring 48. This cam is secured on a shaft 49 forming part of the machine 10—11 and 12.

The workpieces 50 are placed on top of the belt 23 adjacent to the pulley 22 at the left of Figure 1 and move therewith until the same come in contact with the curved face 36 of the stop plate, as shown in Figure 3. The push-in lever 64 is now actuated by the cam 47 and the finger 45 engages and moves the workpiece off the belt 23 until it engages the curved wall 41 of the stop and guide plate, at which time it is in line with the tools for the machining operation. During this transfer the movement of the belt 23 under the workpiece maintains the same in contact with the curved face 36 on the stop plate.

During the tooling operations the push-in lever 64 is returned to its former position ready to transfer the next succeeding workpiece into line with the operating tools. After the tools have performed their operation upon the workpiece the same is projected out of the path thereof by ejecting mechanism, comprising generally a slide 51 and a cam 52 on the shaft 49 which imparts a reciprocatory movement to the slide through the roll 53 thereon.

The cam roll 53 is held in contact by the face of the cam by a spring 54. Guard plates 55 and 56 are located upon opposite sides of the belt 23 and prevent premature lateral movement of the workpiece or the belt. These guard plates will also prevent workpieces on the belt from falling off the edges thereof if perchance the feed of the belt is slightly faster than the workpieces can be taken care of by the operating tools.

After the workpiece has been moved out of the path of the tools, as shown in Figure 3, by the slide 51, the next workpiece is moved into position through the finger 45 and this in turn is engaged by the tools and thus the slide 51 is moved out of the path of the operating tools. The workpieces thus arranged in orderly procession are guided first between the walls 38 and 43 of the plates 35 and 37, and finally between said walls 43 and the walls 42 on the guide plate 36 onto the belt 23 again and are then conveyed to the next machine where similar operations are performed.

By this operation as a workpiece is moved out of the path of the tools it pushes the workpieces in advance thereof, and between the walls 43 and 42, toward and successively onto the belt 23, thus providing transitory means for advancing the workpiece between the guide mechanisms. Any number of these machines may be placed in a row or the operations may be performed on the same machine, whichever may be most convenient or the more readily adapted for the character of the article operated on or the nature of the tooling operations.

If it is desired to present the workpieces to another set of tools in a different position, for illustration, the reverse of that heretofore shown and described, I provide a turning device. This consists essentially of a box-like chute 57, in part supported by a bracket 61, the upper end of which is open and the side walls of which project and are curved across the top of the belt 23 to form the guide walls 58, between which the workpieces are guided into the curved portion 59 of the chute 57, substantially as shown in Figures 5 and 7. The walls 58 terminate in flanges 68 which form guides for the workpieces adjacent to the point of deflection from the belt. As the workpieces are diverted from the belt by the guide walls 58 and 59 they drop into the curved portion of the chute and by doing so reverse their position in the manner substantially as illustrated by the dotted lines in Figure 7. In this reversed position the workpieces slide down through the chute onto the top of the belt 32.

The wall 62 of the chute extends across the belt 32 and is connected therewith to a guide flange 60 and upon the other side of the belt is a similar guide flange 63 between which the workpieces travel to the next station for operations performed in substantially the same manner as those before described. Thus, workpieces may be automatically presented to a series of operating tools and taken off and replaced on the conveyor belt adjacent thereto as well as their relative positions varied, as may be desired.

What I claim is:

1. In a device of the character described; a moving belt; a rigid member upon one side thereof having a stop wall, and a tangential wall upon each side thereof; a stop plate over the belt having guide faces upon opposite sides thereof; a rigid guideplate having a guide wall in extension of one of the said tangential walls and substantially parallel with one of the guide faces of the stop plate, the arrangement of the parts being such that there is an open space between the stop plate, rigid member and guide plate, and extending partially around the stop plate and through which an article travels from and to the belt in a continuous path through said open space; means for moving the article from the belt and placing it against said stop wall, and a member to push the article from said stop wall along one of said tangential walls toward the guide plate, and transitory means for pushing the article between the stop and guide plates, which directs its travel back onto the belt.

2. In a device of the character described; a moving belt; a rigid member upon one side thereof having a stop wall forming an operating station and a tangential wall upon each side thereof; a rigid guide plate having a guide wall in extension of one of the said tangential walls; a stop plate over the belt having guide faces upon opposite sides thereof and upon one edge and so positioned relatively to the rigid member and guide plate that there is an open space therebetween for the article as it approaches the operating station and moved therefrom; means for positively presenting the article from the belt through said open space against the rigid member at said operating station; positive means for moving the same from said operating station in a path substantially parallel with the belt and in the open space around said stop plate; and transitory means for advancing the article from said latter position through said open space and onto the belt, the same being guided in part by the walls of the stop plate.

3. In a device of the character described; a moving belt; a rigid member upon one side thereof having a stop wall forming an operating station and a tangential wall upon each side thereof; a rigid guide plate having a guide wall in extension of one of the said tangential walls; a stop plate over the belt having guide faces upon opposite sides thereof and upon one edge and so positioned relatively to the rigid member and guide plate that there is an open space therebetween for the article as it approaches the operating station and moved therefrom; means for positively presenting the article from the belt through said open space against the rigid member at said operating station; positive means for moving the same from said operating station in a path substantially parallel with the belt and in the open space around said stop plate; transitory means for advancing the article from said latter position through said open space and onto the belt, the same being guided in part by the walls of the stop plate; and cam means upon one side of the operating station whereby the means for advancing the article from the belt to the operating station is actuated and also the mechanism for moving the article from said operating station.

4. In a device of the character described; a moving belt; a rigid member upon one side thereof having a stop wall forming an operating station and a tangential wall upon each side thereof; a rigid guide plate having a guide wall in extension of one of the said tangential walls; a stop plate over the belt having guide faces upon opposite sides thereof and upon one edge and so positioned relatively to the rigid member and guide plate that there is an open space therebetween for the article as it approaches the operating station and moved therefrom; means for positively presenting the article from the belt through said open space against the rigid member at said operating station, comprising in part a rock member and a finger adjustably connected therewith; positive means for moving the same from said operating position in a path substantially parallel with the belt and in the open space around said stop plate; and transitory means for advancing the article from said latter position through said open space and onto the belt, the same being guided in part by the walls of the stop plate.

In testimony whereof, I have hereunto affixed my signature.

ZENAS P. CANDEE.